United States Patent
Li et al.

(10) Patent No.: US 12,150,005 B2
(45) Date of Patent: Nov. 19, 2024

(54) ENHANCEMENT FOR HIGH SPEED TRAIN MEASUREMENTS AND SIGNALING

(71) Applicant: Apple Inc., Cupertino, CA (US)

(72) Inventors: Qiming Li, Beijing (CN); Huaning Niu, San Jose, CA (US); Jie Cui, San Jose, CA (US); Yang Tang, San Jose, CA (US); Dawei Zhang, Saratoga, CA (US); Xiang Chen, Beijing (CN); Manasa Raghavan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/765,615

(22) PCT Filed: Apr. 2, 2021

(86) PCT No.: PCT/CN2021/085250
§ 371 (c)(1),
(2) Date: Mar. 31, 2022

(87) PCT Pub. No.: WO2022/205414
PCT Pub. Date: Oct. 6, 2022

(65) Prior Publication Data
US 2024/0098606 A1    Mar. 21, 2024

(51) Int. Cl.
*H04W 36/00*     (2009.01)
*H04W 36/32*     (2009.01)
*H04W 56/00*     (2009.01)

(52) U.S. Cl.
CPC ....... *H04W 36/32* (2013.01); *H04W 36/0094* (2013.01); *H04W 56/0015* (2013.01)

(58) Field of Classification Search
CPC ............. H04W 36/32; H04W 36/0094; H04W 56/0015
See application file for complete search history.

(56) References Cited

U.S. PATENT DOCUMENTS

| 2019/0274146 A1 | 9/2019 | Tang et al. |
| 2019/0306734 A1 | 10/2019 | Huang et al. |

(Continued)

FOREIGN PATENT DOCUMENTS

| CN | 105578542 A | 5/2016 |
| CN | 112567775 A | 3/2021 |

(Continued)

OTHER PUBLICATIONS

PCT Search Report and Written Opinion dated Nov. 5, 2021 in connection with PCT Application No. PCT/CN2021/085250.
3rd Generation Partnership Project; Technical Specification Group Radio Access Network; NR; Requirements for support of radio resource management (Release 16); 3 GPP TS 38.133V16.5.0 Sep. 2020.

(Continued)

*Primary Examiner* — Kent Krueger
(74) *Attorney, Agent, or Firm* — Kubota & Basol LLP

(57) ABSTRACT

The present disclosure relates to apparatus, methods, computer-readable storage medium and computer program product for high speed train measurements and signaling. A wireless device, comprising: at least one antenna; at least one radio coupled to the at least one antenna; and a processor coupled to the at least one radio; wherein the processor is configured to: receive, via the at least one radio, at least one Radio Resource Control (RRC) signaling from a cellular base station, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell); and perform enhancement on one or more corresponding cells in response to the received at least one RRC signaling, wherein, the enhancement comprises determining a reduced time period for Primary Synchronization Signal (PSS)/Secondary Synchronization Sig- (Continued)

nal (SSS) detection and/or determining a reduced time period for intra-frequency measurements.

20 Claims, 6 Drawing Sheets

(56) References Cited

U.S. PATENT DOCUMENTS

| | | | |
|---|---|---|---|
| 2022/0303811 A1* | 9/2022 | Kakishima | H04L 5/001 |
| 2023/0042702 A1* | 2/2023 | Kim | H04W 8/24 |
| 2024/0056960 A1* | 2/2024 | Axmon | H04W 48/20 |

FOREIGN PATENT DOCUMENTS

| | | |
|---|---|---|
| WO | 2020041125 A1 | 2/2020 |
| WO | 2020088597 A1 | 5/2020 |

OTHER PUBLICATIONS

Ericsson; "Measurement requirements for deactivated SCells in FR2"; 3GPP TSG-RAN WG4; Meeting #AH1807; R4-1808709; Jun. 25, 2018.

5G; NR; Requirements for support of radio resource management (3GPP TS 38.133 version 16.6.0 Release 16); ETSI TS 138 133 V16.6.0 (Feb. 2021).

5G; NR; User Equipment (UE) radio access capabilities (3GPP TS 38.306 version 16.3.0 Release 16); ETSI TS 138 B06 V16.3.0 (Jan. 2021).

5G; NR; Radio Resource Control (RRC); Protocol specification (3GPP TS 38.331 version 16.3.1 Release 16); ETSI TS 138 331 V16.3.1 (Jan. 2021).

PCT Search Report and Written Opinion dated Jul. 9, 2021 in connection with PCT Application No. PCTCN2020/122903.

Discussion on LTE high speed in Rel.16, Huawei, HiSilicon, 3GPP TSG-RAN WG4 Meeting #90, R4-1901239, Mar. 2019.

* cited by examiner

Time period for PSS/SSS detection, deactivated SCell (FR2)

| DRX cycle | $T_{PSS/SSS\_sync\_intra}$ |
|---|---|
| No DRX | $M_{PSS/SSS\_sync\_w/o\_gaps}$ × measCycleSCell × $CSSF_{intra}$ |
| DRX cycle ≤ 320ms | $M_{PSS/SSS\_sync\_w/o\_gaps}$ × max(measCycleSCell, scaling-factor ×DRX cycle) × $CSSF_{intra}$ |
| DXR cycle > 320ms | $M_{PSS/SSS\_sync\_w/o\_gaps}$ × max(measCycleSCell, DRX cycle) × $CSSF_{intra}$ |

Measurement period for intra-frequency measurements without gaps (deactivated SCell) (FR2)

| DRX cycle | $T_{SSB\_measurement\_period\_intra}$ |
|---|---|
| No DRX | $M_{meas\_period\_w/o\_gaps} \times$ measCycleSCell $\times$ CSSF$_{intra}$ |
| DRX cycle $\leq$ 320ms | $M_{meas\_period\_w/o\_gaps} \times$ max(measCycleSCell, scaling-factor $\times$ DRX cycle) $\times$ CSSF$_{intra}$ |
| DXR cycle $>$ 320ms | $M_{meas\_period\_w/o\_gaps} \times$ max(measCycleSCell, DRX cycle) $\times$ CSSF$_{intra}$ |

*FIG. 8*

US 12,150,005 B2

ENHANCEMENT FOR HIGH SPEED TRAIN MEASUREMENTS AND SIGNALING

This application is a National Phase entry application of International Patent Application No. PCT/CN2021/085250 filed Apr. 2, 2021, entitled "ENHANCEMENT FOR HIGH SPEED TRAIN MEASUREMENTS AND SIGNALING", the contents of which are herein incorporated by reference in their entirety.

FIELD

The present disclosure relates to wireless device, cellular base station, methods, apparatus for enhancement in High Speed Train (HST) scenario including wireless device, cellular base station, methods, apparatus for enhancement in Primary Synchronization Signal (PSS)/Secondary Synchronization Signal (SSS) detection and/or intra-frequency measurement.

BACKGROUND

In high speed scenarios (e.g. HST), the moving speed of a User Equipment (UE) may be up to 500 kilometers per hour (km/h). Under such a high speed scenario, latency regarding various aspects (e.g. Radio Resource Management (RRM) measurement, PSS/SSS detection, etc.) is required to be reduced.

However, currently, there lacks a comprehensive mechanism to inform a UE to switch to high speed mode (e.g. HST mode) and enhance its operations accordingly.

SUMMARY

Aspects relate to device, method, apparatus, computer-readable storage medium and computer program product for wireless communication.

According to one aspect, there is provided a wireless device, comprising: at least one antenna; at least one radio coupled to the at least one antenna; and a processor coupled to the at least one radio; wherein the processor is configured to: receive, via the at least one radio, at least one Radio Resource Control (RRC) signaling from a cellular base station, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell); and perform enhancement on one or more corresponding cells in response to the received at least one RRC signaling, wherein, the enhancement comprises determining a reduced time period for Primary Synchronization Signal (PSS)/Secondary Synchronization Signal (SSS) detection and/or determining a reduced time period for intra-frequency measurements.

According to another aspect, there is provided a cellular base station, comprising: at least one antenna; at least one radio coupled to the at least one antenna; and a processor coupled to the at least one radio; wherein the processor is configured to: transmit, via the at least one radio, at least one Radio Resource Control (RRC) signaling to a wireless device, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell), wherein, the at least one RRC signaling causes the wireless device to perform enhancement on one or more corresponding cells, the enhancement comprises determining a reduced time period for Primary Synchronization Signal (PSS)/Secondary Synchronization Signal (SSS) detection and/or determining a reduced time period for intra-frequency measurements.

According to another aspect, there is provided a method for a wireless device, comprising: receiving at least one Radio Resource Control (RRC) signaling from a cellular base station, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell); and performing enhancement on one or more corresponding cells in response to the received at least one RRC signaling, wherein, the enhancement comprises determining a reduced time period for Primary Synchronization Signal (PSS)/Secondary Synchronization Signal (SSS) detection and/or determining a reduced time period for intra-frequency measurements.

According to another aspect, there is provided a method for a cellular base station, comprising transmitting at least one Radio Resource Control (RRC) signaling to a wireless device, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell), wherein, the at least one RRC signaling causes the wireless device to perform enhancement on one or more corresponding cells, the enhancement comprises determining a reduced time period for Primary Synchronization Signal (PSS)/Secondary Synchronization Signal (SSS) detection and/or determining a reduced time period for intra-frequency measurements.

According to another aspect, there is provided an apparatus, comprising: a processor configured to cause a wireless device to: receive at least one Radio Resource Control (RRC) signaling from a cellular base station, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell); and perform enhancement on one or more corresponding cells in response to the received at least one RRC signaling, wherein, the enhancement comprises determining a reduced time period for Primary Synchronization Signal (PSS)/Secondary Synchronization Signal (SSS) detection and/or determining a reduced time period for intra-frequency measurements.

According to another aspect, there is provided a computer-readable storage medium storing program instructions, wherein the program instructions, when executed by a computer system, cause the computer system to perform the method of any of the above aspects.

According to another aspect, there is provided a computer program product, comprising program instructions which, when executed by a computer, cause the computer to perform the method of any of the above aspects.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various aspects is considered in conjunction with the following drawings, in which:

FIG. 8 illustrates a table for determining a measurement period for intra-frequency measurements detection on deactivated SCC in FR2.

Figure 1:
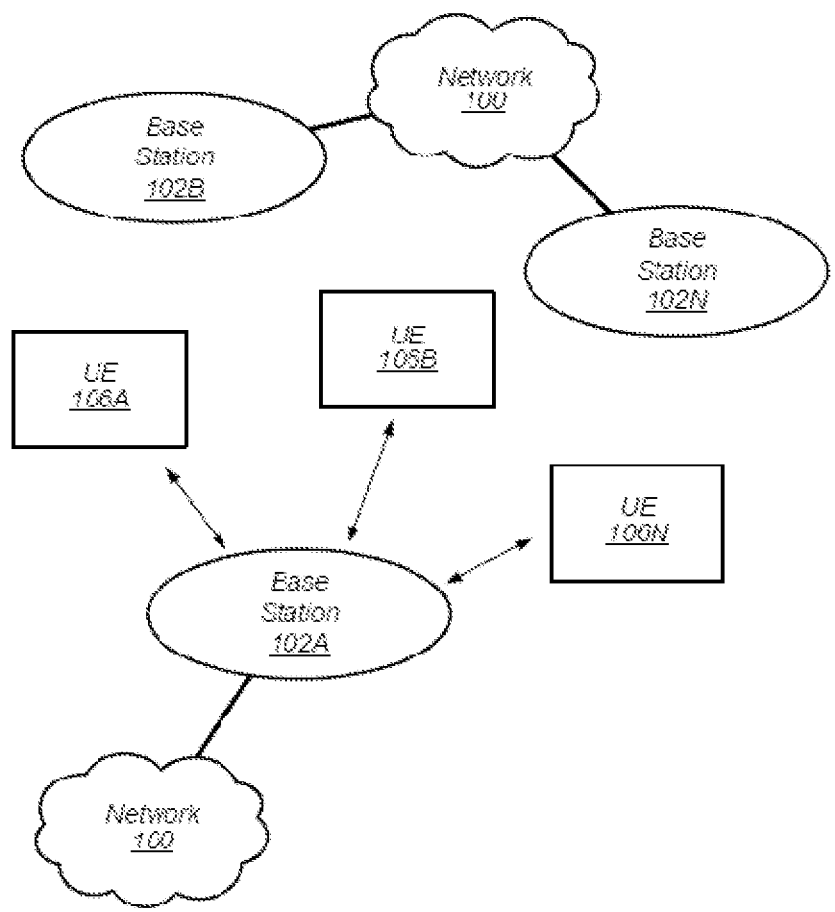
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
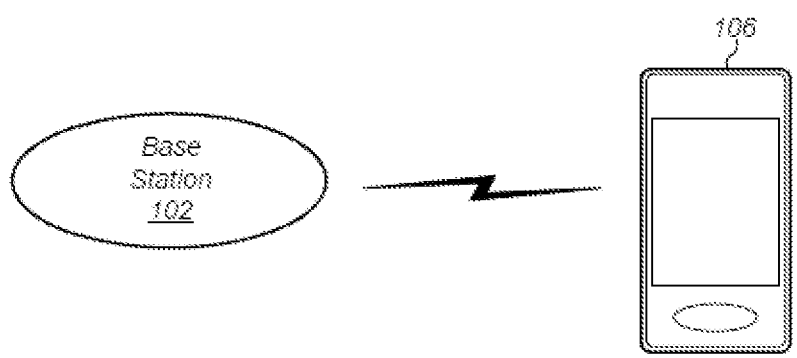
FIG. 2 illustrates a base station (BS) in communication with a user equipment (UE) device, according to some aspects.

FIGS. 1 and 2—Communication System

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNB s. For example, it may be possible that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
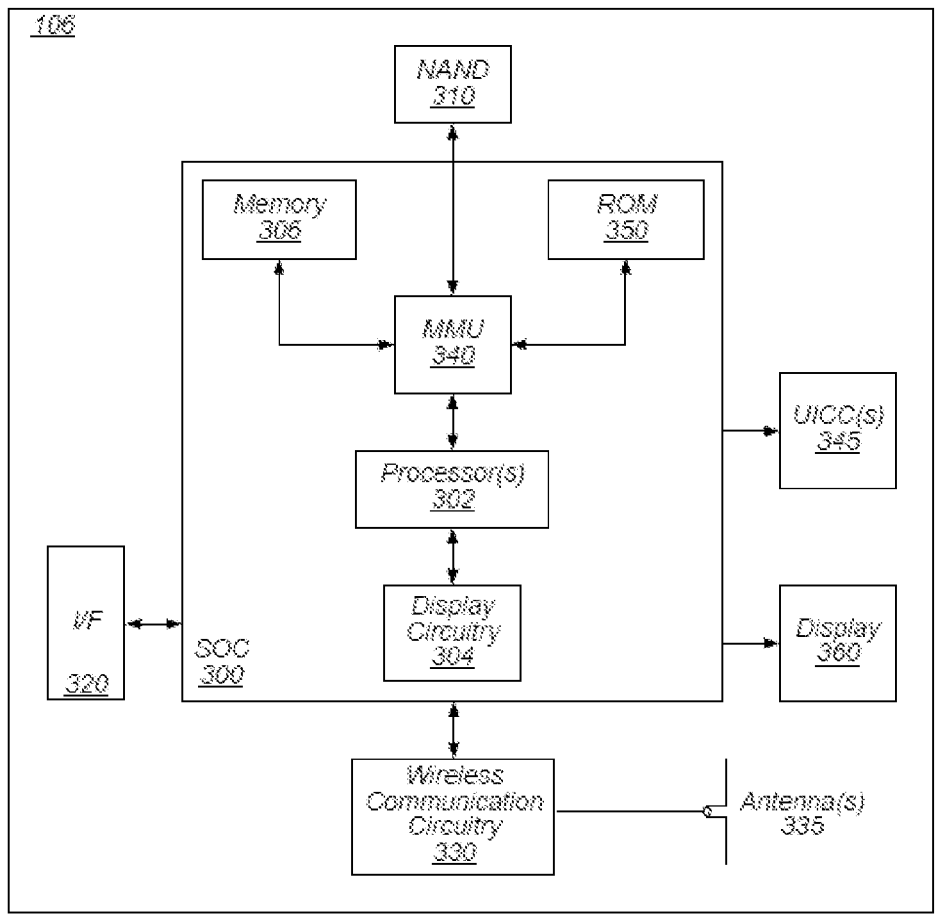
FIG. 3 illustrates an example block diagram of a UE, according to some aspects.

FIG. 3—Block Diagram of a UE

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
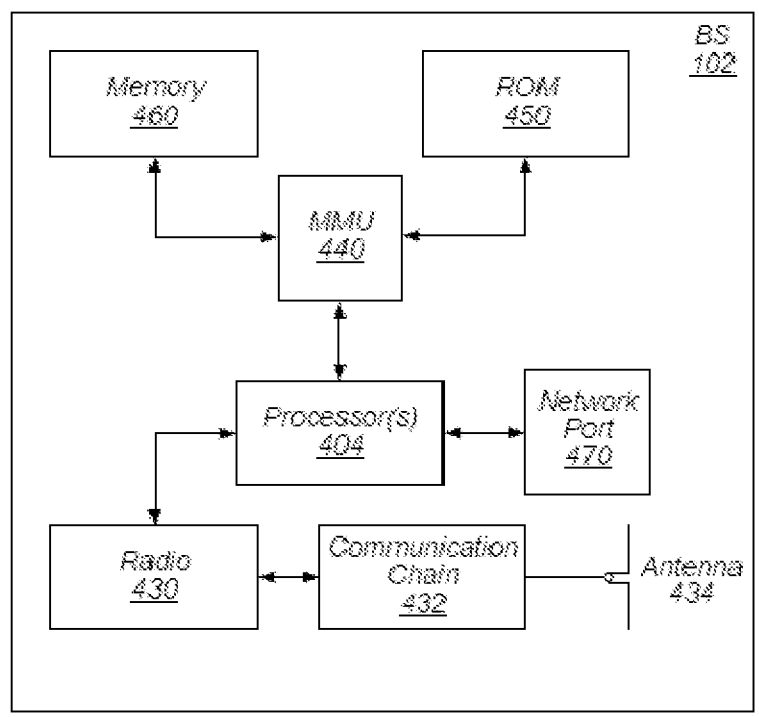
FIG. 4 illustrates an example block diagram of a BS, according to some aspects.

FIG. 4—Block Diagram of a Base Station

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
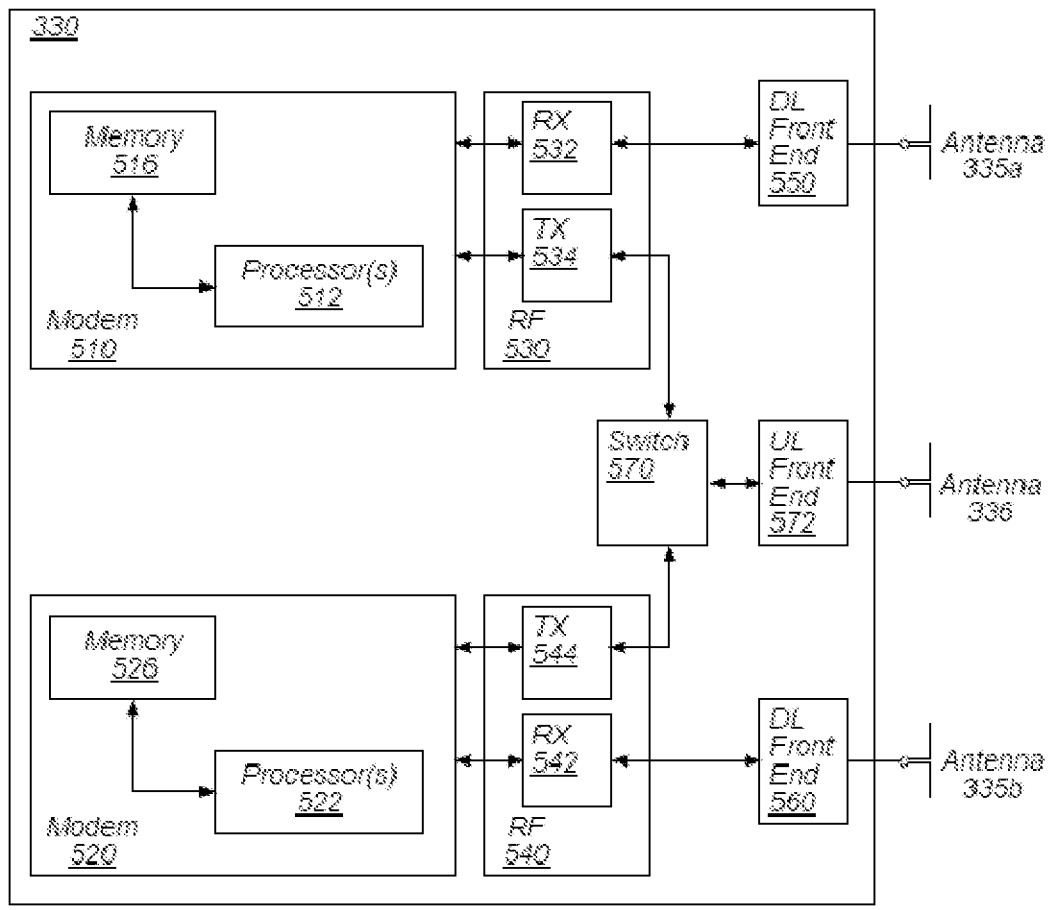
FIG. 5 illustrates an example block diagram of cellular communication circuitry, according to some aspects.

FIG. 5—Block Diagram of Cellular Communication Circuitry

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

FIG. 6-9—Detailed Illustration of the Present Disclosure

The following description will take 5G NR as an example to illustrate the concept of the present disclosure, but it should be understood that the solution of the present disclosure is applicable to any appropriate mobile communication technology (e.g. 6G or any applicable advanced mobile communication technology).

In the following description, gNB is sometimes used to represent the control device at the base station side in a wireless communication network. It should be understood this is for illustrative purpose only but not restrictive. A base station based on any appropriate mobile communication technology is applicable.

As described above, in high speed scenarios (e.g. HST), the moving speed of a User Equipment (UE) may be up to 500 kilometers per hour (km/h). Under such a high speed scenario, various procedures, such as the procedures for performing measurements and accessing to a target cell (e.g. during initial access, handover etc.) shall be accomplished with reduced latency, otherwise the UE may move outside of the coverage of the target cell due to the very high moving speed.

In order to meet the requirements for reduced latency, on one hand, the UE is required to be able to determine that it is under the high speed scenario, and on the other hand, the UE is required to take some actions for enhancing its operations under such a high speed scenario for reducing the latency.

Millimeter wave is utilized in 5G New Radio (NR) to expand the frequency resources. Currently, two types of frequency range are defined in 3GPP, i.e. Sub 6 GHz range (450 MHz-6000 MHz) which is called FR1 and millimeter wave range (24250 MHz-52600 MHz) which is called FR2. However, high frequency (e.g. millimeter wave) implies large signal propagation path loss. Beamforming is used to remedy the path loss. In FR2 scenarios, since a UE needs to try different beams to perform measurement and/or PSS/SSS detection, additional latency is incurred. In view of this, to ensure the UE being properly connected to a target cell under HST scenarios, it is expected to reduce latency especially in FR2.

Besides, Carrier Aggregation (CA) and Dual Connectivity (DC) are both enabled in 5G NR to improve capacity, for example. Some specific cells are introduced by these technologies, e.g. Secondary Cell (SCell) in CA and Primary Secondary Cell (PSCell) in DC. However, currently there lacks enhancement regarding latency in these specific cells especially in FR2.

To solve the above-mentioned problems, the present disclosure provides a comprehensive configuration of signaling between a base station and a UE for enhancement on latency reduction. In addition, the present disclosure provides specific solutions for a UE to reduce time period for PSS/SSS detection and intra-frequency measurements.

Note that, although the present disclosure takes the HST scenario as an example to describe the proposed solutions, the present disclosure is not limited to the HST scenario, and the proposed solutions (illustrated in detail below) can apply to any scenario which requires to reduce latency.

Figures 6, 7:
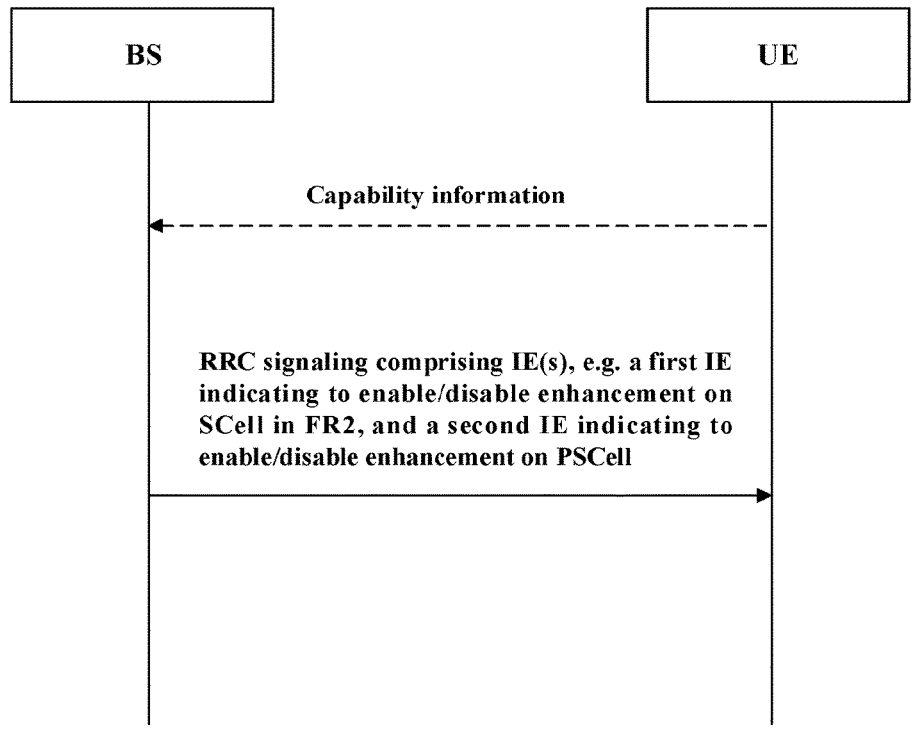
FIG. 6 illustrates a general flow-chat according to the present disclosure.
FIG. 7 illustrates a table for determining a time period for PSS/SSS detection on deactivated Secondary Component Carrier (SCC) in Frequency Range 2 (FR2)

FIG. 6 is a general flow-chat according to the present disclosure.

As illustrated in FIG. 6, according to the present disclosure, the base station (herein after BS) can provide at least one RRC signaling to a wireless device (herein after UE). The at least one RRC signaling can at least comprise one or more information element (IE) of a group of IEs which are defined according to the present disclosure to indicate the UE to enable or disable certain enhancement, e.g. regarding latency. For example, each IE can consist of one bit, and when the bit is set to 1 (or 0), the UE is instructed to enable certain enhancement, while when the bit is set to 0 (or 1 accordingly), the UE is instructed to disable certain enhancement. According to the present disclosure, the enhancement can comprise determining a reduced time period for PSS/SSS detection and/or determining a reduced time period for intra-frequency measurements.

The enhancement performed in response to receiving the at least one RRC signaling comprising the IE(s) defined according to the present disclosure mainly intends to reduce latency, for example, for HST scenarios. For example, the at least one RRC signaling comprising the IE(s) defined according to the present disclosure can be transmitted once the BS detects the UE is involved in the HST scenario. As an example, once a person carrying his/her UE gets on a high speed train, the UE will connect with a network specific to the HST scenario. Thus, the related BS can recognize that the UE is involved in the HST scenario and transmit the at least one RRC signaling comprising the IE(s) defined according to the present disclosure to the UE. There are other approaches for the BS to detect the UE being involved in the HST scenario, for example, the BS can make the detection by detecting the moving speed of the UE.

According to an aspect, the at least one RRC signaling comprising the IE(s) defined according to the present disclosure can be broadcasted to UEs involved in the HST scenario (e.g. UEs connected to the network specific to the HST scenario), such that even the UE which is in idle state can receive the IE(s) of the present disclosure and perform enhancement on corresponding cell(s) during the procedure of establishing the RRC connection.

According to another aspect, the BS can transmit the at least one RRC signaling comprising the IE(s) defined according to the present disclosure in response to receiving capability information from the UE indicating that the UE supports certain enhancement. This generally applies to the case where the UE has established the RRC connection with the BS. For example, the BS can provide the IE(s) to the UE in accordance with the UE's capability. For example, the at least one RRC signaling comprising the IE(s) defined according to the present disclosure can be transmitted if the BS has received the capability information from the UE indicating that UE supports certain enhancement.

As describe above, the at least one RRC signaling can at least comprise one or more IE of a group of IEs which are defined according to the present disclosure to indicate certain enhancement. For example, the BS can choose some IE(s) from the group of IEs according to the actual situation. For example, the BS can determine on which cell(s) (e.g. SCell, PSCell, or PCell) the UE shall perform enhancement to reduce the latency, and choose the IE(s) specific to the cell(s) to include in the at least one RRC signaling. For another example, the BS can further determine the working frequency band (F1 or F2) between the UE and the target cell(s), and choose the IE(s) specific to both the target cell(s) and the working frequency band to include in the at least one RRC signaling. In the case where there are more than one IEs to be transmitted to the UE, these IEs can be included in different RRC signaling or in one same RRC signaling according to the actual signaling configuration.

According to the present disclosure, the group of IEs can at least include a first IE indicating to enable or disable enhancement on an SCell in FR2, and a second IE indicating to enable or disable enhancement on a PSCell. For example, the first IE may be named as highSpeedMeasFlagSCellFR2 in the RRC signaling, and the second IE may be named as highSpeedMeasFlagPSCell or highSpeedMeasPSCellFR1 or highSpeedMeasFlagPSCellFR2 in the RRC signaling. For example, the first IE may be provided in the case where the target cell is an SCell working in FR2 and the second IE may be provided in the case where the target cell is a PSCell working in either FR1 or FR2.

In response to receiving the signaling comprising the first IE, the UE can perform enhancement on the SCell in FR2. Since there may be more than one SCells configured for a UE when CA is applied, the UE can perform enhancement on all of the SCells in FR2 or part of the SCells in FR2 in response to the received signaling comprising the first IE, which will be described in detail below.

In response to receiving the signaling comprising the second IE, the UE can perform enhancement on the PSCell. Generally, when DC is applied, the working frequency range of the PSCell will be fixed, i.e. either in FR1 or FR2. Therefore, the second IE can merely indicate the UE to perform enhancement on the PSCell without specifying the frequency range. In this case, the second IE may be generally named as highSpeedMeasFlagPSCell. Alternatively, the second IE can also explicitly indicate the UE to perform enhancement on the PSCell in a certain frequency range. In this case, the second UE may be named as highSpeedMeasFlagPSCellFR1 or highSpeedMeasFlagPSCellFR2 based on the actual frequency range. Note that in practice, there may be three cases for DC:

EN-DC: LTE as PCell with NR as PSCell;
NE-DC: NR as PCell with LTE as PSCell; and
NR-DC: NR as PCell with NR as PSCell, where "E" represents LTE and "N" represents NR in "EN-DC" and "NE-DC".

The second IE provided in the present disclosure is applicable to any of the three cases.

Note that the SCell is a specific cell when CA is applied and the PSCell is a specific cell when DC is applied. Since CA and DC can be both applied to the UE, it is possible that both the first IE and the second IE are provided to the UE. In this case, the UE shall perform enhancement on the SCell and the PSCell.

According to the present disclosure, in addition to the first IE and the second IE, the group of IEs can further include a third IE indicating to enable enhancement on the SCell in FR1, and a fourth IE indicating to enable enhancement on a Primary Cell (PCell) in FR2. For example, the third IE may be named as highSpeedMeasFlagSCellFR1 in the RRC signaling, and the fourth IE may be named as highSpeedMeasFlagPCellFR2 in the RRC signaling. For example, the third IE may be provided in the case where the target cell is an SCell working in FR1 and the fourth IE may be provided in the case where the target cell is a PCell working in FR2.

In response to receiving the signaling comprising the third IE, the UE can perform enhancement on the SCell in FR1. Similarly to the first IE, the UE can perform enhancement on all of the SCells in FR1 or part of the SCells in FR1 in response to the received signaling comprising the third IE. In response to receiving the signaling comprising the fourth IE, the UE can perform enhancement on the PCell in FR2.

The IE(s) of the present disclosure can be defined with different granularity. For example, the first IE, the third IE and/or the fourth IE can be defined per UE, per band or per carrier, and the second IE can be defined per UE or per band. In the case where the IE is defined per UE, each UE can enable/disable the corresponding enhancement on the target cell based can on the value of the received IE.

According to a preferred aspect, the IE (e.g. any of the first, second, third and fourth IE) can be defined per band. In this case, when a UE receives such an IE, it will determine if the working band between the UE and the target cell corresponds to the band for which the IE is defined. If the working band corresponds to the band for which the IE is defined, the UE can enable/disable the corresponding enhancement on the target cell based on the value of the received IE. Otherwise, the UE can discard the received IE without performing or disabling the corresponding enhancement on the target cell. In fact, performing enhancement regarding the latency under the HST scenario requires some costs on various aspects (e.g. power, computation, etc.). Generally, the higher frequency would cause larger Doppler Effect, which requires higher costs for a UE to perform the enhancement. Defining the IE(s) per band allows flexible configuration. For example, when the frequency of the working band is higher than a threshold, the BS can choose not to instruct the UE to perform enhancement, so as to avoid excessive costs for the UE.

According to another preferred aspect, the IE (e.g. any of the first, third and fourth IE) can be defined per carrier. Such configuration can further limit the number of carriers to be used when CA is applied under the HST scenario. For example, if initially four carriers are defined for a UE (e.g. one Primary Component Cell (PCC) and three Secondary Component Cell (SCC)), the BS can define the IE(s) for only some of the four carriers (e.g. the PCC and one SCC). Once the IE(s) indicating to enable the enhancement is received by the UE, the UE can only performs CA on the cells for which the IE(s) is defined and performs enhancement on these cells, such that the costs for UE can be reduced while the reduced latency requirement under HST scenario can be achieved.

According to another preferred aspect, the IE of the present disclosure can be defined per band and per carrier. In this case, only if working band of the carrier for which the IE is defined corresponds to the band for which the IE is defined, the UE enables/disables the corresponding enhancement on the carrier.

As described above, the BS can choose some IE(s) from the group of IEs to include in the at least RRC signaling according to the actual situation, so as to inform the UE to enable or disable certain enhancement on certain cell(s) in certain frequency range. For example, the BS can choose the IE(s) from the group of IEs to include in the at least RRC signaling according to the type of the target cell (e.g. SCell, PCell or PSCell) and the working frequency range (e.g. FR2 or FR1). According to the present disclosure, the BS can transmit the different IEs for different types of target cells separately to inform the UE to enable or disable the enhancement on target cells with different types. Alternatively, the BS can transmit a single IE to implicitly inform the UE to enable or disable the enhancement on target cells with different types. In the latter case, when the IE related to the SCell is transmitted to the UE, the UE can be implicitly informed to enable or disable the enhancement on the PCell in accordance with the SCell, and the BS no longer needs to transmit the IE specific to the PCell.

In the case where the PCell is operating in FR2 and the SCell is operating in FR2, the at least one RRC signaling received by the UE can comprise both the first IE indicating to enable/disable enhancement on a SCell in FR2 and the fourth IE indicating to enable/disable enhancement on a PCell in FR2. Alternatively, the at least one RRC signaling received by the UE can comprise the first IE solely, so as to implicitly inform the UE that in accordance with the SCell, the enhancement shall be enabled/disabled on the PCell as well.

In the case where the PCell is operating in FR1 and the SCell is operating in FR2, the at least one RRC signaling received by the UE can comprise both an IE corresponding to a high speed measurement flag (e.g. the IE highSpeedMeasFlag-r16 specified in 3GPP TS 38.133V17.0.0) which gives an general instructions that the UE shall switch to HST mode in FR1 and the first IE, so as to separately inform the UE that the enhancement on PCell in FR1 and on SCell in FR2 shall be enabled/disabled. Alternatively, the at least one RRC signaling received by the UE can comprise the first IE solely, so as to implicitly inform the UE that in accordance with the SCell, the enhancement shall be enabled/disabled on the PCell as well.

In the case where the PCell is operating in FR1 and the SCell is operating in FR1, the at least one RRC signaling received by the UE can comprise both the IE corresponding to a high speed measurement flag (e.g. the IE highSpeedMeasFlag-r16 specified in 3GPP TS 38.133V17.0.0) and the third IE indicating to enable/disable enhancement on the SCell in FR1, so as to separately inform the UE that the enhancement on PCell in FR1 and on SCell in FR1 shall be enabled/disabled. Alternatively, the at least one RRC signaling received by the UE can comprise the third IE solely, so as to implicitly inform the UE that in accordance with the SCell, the enhancement shall be enabled/disabled on the PCell as well.

As described above and shown in FIG. 6, the BS can transmit the at least one RRC signaling comprising the IE(s) defined according to the present disclosure in response to receiving capability information from the UE indicating that UE supports certain enhancement. For example, the UE can transmit at least one capability information to the BS. The at least one capability information can comprise one or more of a first capability information indicating support of enhancement on the SCell in FR2, a second capability information indicating support of enhancement on a PSCell, a third capability information indicating support of enhancement on the SCell in FR1, and a fourth capability information indicating support of enhancement on the PCell in FR2. For example, in RRC signaling from the UE to BS, the first capability information can be named as measurementEnhancementHSTSCellFR2, the second capability information can be named as measurementEnhancementHSTPSCell, the third capability information can be named as measurementEnhancementHSTSCellFR1 and the fourth capability information can be named as measurementEnhancementHSTPCellFR2.

Particularly, the second capability information can indicate the UE supports the enhancement on a PSCell operating in any frequency range, i.e. regardless of FR1 or FR2. In the case where the UE only supports the enhancement on a PSCell operating in a certain frequency range, i.e. FR1 or FR2, the UE can provide the capability information specific to the PSCell and to the frequency range. In this case, such capability information can be named as measurementEnhancementHSTPSCellFR1 or measurementEnhancementHSTPSCellFR2.

According to the present disclosure, the capability information can be voluntarily transmitted by the UE once the RRC connection has been established between the UE and the BS. Alternatively, the capability information can be transmitted in response to the request from the BS.

The UE can transmit all of its capability information regarding the enhancement to the BS. Alternatively, instead of transmitting all of the capability information at one time, the UE can transmit some of its capability information, for example depending on the type of the target cell and the working frequency band, or in response to the request from the BS.

The signaling regarding the enhancement in latency has been described above. The detailed operations for performing enhancement will be described hereinafter referring to FIGS. 7 and 8.

As described above, the enhancement to be performed on one or more corresponding cells in response to the received at least one RRC signaling may comprise determining a reduced time period for PSS/SSS detection and/or determining a reduced time period for intra-frequency measurements. The detailed operations will be described hereinafter respectively.

According to the present disclosure, the reduced time period for PSS/SSS detection can be determined at least based on a number of occasions needed for identifying a target cell (a cell to be connected with the UE, e.g. during initial access, handover etc.), a size of a discontinuous reception (DRX) cycle and a scaling factor for DRX, and in determining the reduced time period for PSS/SSS detection:

the number of occasions can be determined as an integer smaller than 24, and/or the scaling factor can be determined as a value less than 1.5.

The number of occasions needed for identifying a target cell will be referred as M hereinafter. Each occasion can correspond to a Synchronization Signal Block (SSB)-based Measurement Timing Configurations (SMTC) window during which the UE shall measure an SSB. For one target cell, the number of occasions for identifying it, i.e. M is typically configured as 24 regardless of latency requirement. According to an aspect, in order to enable fast PSS/SSS detection, the UE can reduce the number of occasions needed for identifying a target cell, i.e. M, so as to further limit the maximum time for identifying the target cell. For example, the value of M can be reduced from 24 to e.g. 20 or 16, or any other value less than 24.

In addition to reducing the number of occasions for identifying a target cell, the UE can also or alternatively reduce a scaling factor for DRX in determining the time period for PSS/SSS detection. The scaling factor is typically configured as 1.5 regardless of latency requirement. For example, to enable fast PSS/SSS detection, the scaling factor can be reduced from 1.5 to 1, or any other value less than 1.5 but larger than zero.

According to an aspect, the scaling factor can be reduced with certain condition. For example, the scaling factor can be determined as a value less than 1.5 if an SMTC periodicity is equal to or less than 40 ms, such that the network side can be encouraged not to use too long SMTC periodicity to impede the latency reduction.

According to an aspect, different M and/or scaling factors can be applied for different sizes of the DRX cycle. For example, the number of occasions M can be determined as different values for the DRX cycle having a size equal to or smaller than a predetermined threshold, and for the DRX cycle having a size larger than the predetermined threshold, and/or the scaling factor can be determined as different values for the DRX cycle having a size equal to or smaller than a predetermined threshold, and for the DRX cycle having a size larger than the predetermined threshold. For example. Such a threshold can be 160 ms.

FIG. 7 illustrates a calculation example for determining the time period for PSS/SSS detection on deactivated SCC in FR2, wherein $T_{PSS/SSS\_sync\_intra}$ refers to the time period for PSS/SSS detection, $M_{PSS/SSS\_sync\_w/o\_gaps}$ refers to the above-mentioned number of occasions for identifying a target cell, measCycleSCell is the measurement periodicity of the deactivated SCC configured by the network side, $CSSF_{intra}$ is a carrier-specific value and the present disclosure is not interested in the calculation thereof, and "scaling-factor" is the above mentioned scaling factor for DRX.

As shown in FIG. 7, although the detailed calculation formulas for the determination of the time period for PSS/SSS detection on deactivated SCC in FR2 are different for the cases where no DRX is applied, the DRX cycle is equal to or less than 320 ms and the DRX cycle is larger than 320 ms, the spirit of the present, i.e. reducing M and/or the scaling factor can be applied to these formulas, e.g. M can be reduced for any of the cases and/or the scaling factor can be reduced for the case where DRX cycle is equal to or less than 320 ms. Particularly, the case where DRX cycle is equal to or less than 320 ms can be split into two cases: DRX cycle≤160 ms and 160 ms≤DRX cycle≤320 ms, and different $M_{PSS/SSS\_sync\_w/o\_gaps}$ and/or scaling factors can be applied respectively for these two cases.

In FIG. 7, the number of occasions for identifying a target cell under the case without gaps (i.e. $M_{PSS/SSS\_sync\_w/o\_gaps}$) is shown in the formulas as an example, the spirit of the present disclosure is not limited to the case without gaps and can also apply to the case with gaps.

According to the present disclosure, the reduced time period for intra-frequency measurements can be determined at least based on a number of occasions M needed for identifying a target cell (a cell to be connected with the UE, e.g. during initial access, handover etc.), a size of DRX cycle and a scaling factor for DRX, and in determining the reduced time period for intra-frequency measurements: the number of occasions can be determined as an integer smaller than 24, and/or the scaling factor can be determined as a value less than 1.5.

According to an aspect, in order to enable fast measurement, the UE can reduce the number of occasions needed for identifying a target cell, i.e. M, so as to further limit the maximum time for identifying the target cell. The number of occasions M is typically configured as 24 regardless of latency requirement. For example, to enable fast measurement, the value of M can be reduced from 24 to e.g. 20 or 16, or any other value less than 24.

In addition to reducing the number of occasions for identifying a target cell, the UE can also or alternatively reduce a scaling factor for DRX in determining the time period for intra-frequency measurements detection. The scaling factor is typically configured as 1.5 regardless of latency requirement. For example, to enable fast measurement, the scaling factor can be reduced from 1.5 to 1, or any other value less than 1.5 but larger than zero.

According to an aspect, the scaling factor can be reduced with certain condition. For example, the scaling factor can be determined as a value less than 1.5 if an SMTC periodicity is equal to or less than 40 ms, such that the network side can be encouraged not to use too long SMTC periodicity to impede the latency reduction.

According to an aspect, different M and/or scaling factors can be applied for different sizes of the DRX cycle. For example, the number of occasions M can be determined as different values for the DRX cycle having a size equal to or smaller than a predetermined threshold, and for the DRX cycle having a size larger than the predetermined threshold, and/or the scaling factor can be determined as different values for the DRX cycle having a size equal to or smaller than a predetermined threshold, and for the DRX cycle having a size larger than the predetermined threshold. For example. Such a threshold can be 160 ms.

FIG. 8 illustrates a calculation example for determining the time period for intra-frequency measurements on deactivated SCC in FR2, wherein $T_{SSB\_measurement\_period\_intra}$ refers to the time period for intra-frequency measurements, $M_{meas\_period\_w/o\_gaps}$ refers to the above-mentioned number of occasions for identifying a target cell, measCycleSCell is the measurement periodicity of the deactivated SCC configured by the network side, $CSSF_{intra}$ is a carrier-specific value and the present disclosure is not interested in the calculation thereof, and "scaling-factor" is the above mentioned scaling factor for DRX.

As shown in FIG. 8, although the detailed calculation formulas for the determination of the time period for intra-frequency measurement on deactivated SCC in FR2 are different for the cases where no DRX is applied, the DRX cycle is equal to or less than 320 ms and the DRX cycle is larger than 320 ms, the spirit of the present, i.e. reducing M and/or the scaling factor, can be applied to these formulas, e.g. M can be reduced for any of the cases and/or the scaling factor can be reduced for the case where DRX cycle is equal to or less than 320 ms. Particularly, the case where DRX cycle is equal to or less than 320 ms can be split into two cases: DRX cycle≤160 ms and 160 ms≤DRX cycle≤320 ms, and different $M_{PSS/SSS\_sync\_w/o\_gaps}$ and/or scaling factors can be applied respectively for these two cases.

In FIG. 8, the number of occasions for identifying a target cell under the case without gaps (i.e. $M_{meas\_period\_w/o\_gaps}$) is shown in the formulas as an example, the spirit of the present disclosure is not limited to the case without gaps and can also apply to the case with gaps.

Although the detailed operations regarding the enhancement are described for the SCell in FR2, the spirit of the present, i.e. reducing M and/or the scaling factor for DRX can be applied as appropriate for other types of cells and other frequency range.

The above has described in detail the signaling configuration for enhancement regarding latency and some detailed aspects for performing enhancement. In addition, the present disclosure can also have any of the configurations below.

(1) A wireless device, comprising:
at least one antenna;
at least one radio coupled to the at least one antenna; and
a processor coupled to the at least one radio;
wherein the processor is configured to:
receive, via the at least one radio, at least one Radio Resource Control (RRC) signaling from a cellular base station, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell); and
perform enhancement on one or more corresponding cells in response to the received at least one RRC signaling,
wherein, the enhancement comprises determining a reduced time period for Primary Synchronization Signal (PSS)/Secondary Synchronization Signal (S S S) detection and/or determining a reduced time period for intra-frequency measurements (2) The wireless device of (1), wherein
the processor is further configured to transmit, via the at least one radio, at least one capability information to the cellular base station, wherein the at least one capability information comprises one or more of a first capability information indicating support of enhancement on the SCell in FR2, a second capability information indicating support of enhancement on a PSCell, a third capability information indicating support of enhancement on the SCell in Frequency Range 1 (FR1), and a fourth capability information indicating support of enhancement on the Primary Cell (PCell) in FR2.

(3) The wireless device of (1) or (2), wherein
the group of IEs further includes a third IE indicating to enable or disable enhancement on the SCell in Frequency Range 1 (FR1), and a fourth IE indicating to enable or disable enhancement on a Primary Cell (PCell) in FR2.

(4) The wireless device of (3), wherein
the first IE, the third IE and/or the fourth IE is defined per User Equipment (UE), per band or per carrier; and/or
the second IE is defined per UE or per band.

(5) The wireless device of (3), wherein
in the case where the PCell is operating in FR2 and the SCell is operating in FR2, the received at least one RRC signaling comprises both the first IE and the fourth IE, or the received at least one RRC signaling comprises the first IE solely;
in the case where the PCell is operating in FR1 and the SCell is operating in FR2, the received at least one RRC signaling comprises both an IE corresponding to a high speed measurement flag and the first IE, or the received at least one RRC signaling comprises the first IE solely; and
in the case where the PCell is operating in FR1 and the SCell is operating in FR1, the received at least one RRC signaling comprises both the IE corresponding to the high speed measurement flag and the third IE, or the received at least one RRC signaling comprises the third IE solely.

(6) The wireless device of (1) or (2), wherein
the reduced time period for PSS/SSS detection is determined at least based on a number of occasions needed for identifying a target cell, a size of a discontinuous reception (DRX) cycle and a scaling factor for DRX, and
in determining the reduced time period for PSS/SSS detection:
the number of occasions is determined as an integer smaller than 24, and/or
the scaling factor is determined as a value less than 1.5.

(7) The wireless device of (6), wherein
the scaling factor is determined as a value less than 1.5 if a Synchronization Signal Block-based Measurement Timing Configuration (SMTC) periodicity is equal to or less than 40 ms.

(8) The wireless device of (6), wherein
the number of occasions is determined as different values for the DRX cycle having a size equal to or smaller than a predetermined threshold, and for the DRX cycle having a size larger than the predetermined threshold, and/or
the scaling factor is determined as different values for the DRX cycle having a size equal to or smaller than a predetermined threshold, and for the DRX cycle having a size larger than the predetermined threshold.

(9) The wireless device of (1) or (2), wherein
the reduced time period for intra-frequency measurements is determined at least based on a number of occasions needed for identifying a target cell, a size of a discontinuous reception (DRX) cycle and a scaling factor for DRX, and
in determining the reduced time period for intra-frequency measurements:
the number of occasions is determined as an integer smaller than 24; and/or
the scaling factor is determined as a value less than 1.5.

(10) The wireless device of (9), wherein
the scaling factor is determined as a value less than 1.5 if a Synchronization Signal Block-based Measurement Timing Configuration (SMTC) periodicity is equal to or less than 40 ms.

(11) The wireless device of (8), wherein
the number of occasions is determined as different values for the DRX cycle having a size equal to or smaller than a predetermined threshold, and for the DRX cycle having a size larger than the predetermined threshold, and/or the scaling factor is determined as different values for the DRX cycle having a size equal to or smaller than a predetermined threshold, and for the DRX cycle having a size larger than the predetermined threshold.

(12) A cellular base station, comprising:
at least one antenna;
at least one radio coupled to the at least one antenna; and
a processor coupled to the at least one radio;
wherein the processor is configured to:
transmit, via the at least one radio, at least one Radio Resource Control (RRC) signaling to a wireless device, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell),
wherein, the at least one RRC signaling causes the wireless device to perform enhancement on one or more corresponding cells, the enhancement comprises determining a reduced time period for Primary Synchronization Signal (PSS)/Secondary Synchronization Signal (SSS) detection and/or determining a reduced time period for intra-frequency measurements.

(13) The cellular base station of (12), wherein
the processor is further configured to receive, via the at least one radio, at least one capability information from the wireless device, wherein the at least one capability information comprises one or more of a first capability information indicating support of enhancement on the SCell in FR2, a second capability information indicating support of enhancement on a PSCell, a third capability information indicating support of enhancement on the SCell in Frequency Range 1 (FR1), and a fourth capability information indicating support of enhancement on the Primary Cell (PCell) in FR2.

(14) The cellular base station of (12) or (13), wherein
the group of IEs further includes a third IE indicating to enable or disable enhancement on the SCell in Frequency Range 1 (FR1), and a fourth IE indicating to enable or disable enhancement on a Primary Cell (PCell) in FR2.

(15) The cellular base station of (14), wherein
the first IE, the third IE and/or the fourth IE is defined per User Equipment (UE), per band or per carrier; and/or
the second IE is defined per UE or per band.

(16) The cellular base station of (14), wherein
in the case where the PCell is operating in FR2 and the SCell is operating in FR2, the at least one RRC signaling comprises both the first IE and the fourth IE, or the at least one RRC signaling comprises the first IE solely;
in the case where the PCell is operating in FR1 and the SCell is operating in FR2, the at least one RRC signaling comprises both an IE corresponding to a high speed measurement flag and the first IE, or the at least one RRC signaling comprises the first IE solely; and
in the case where the PCell is operating in FR1 and the SCell is operating in FR1, the at least one RRC signaling comprises both the IE corresponding to the high speed measurement flag and the third IE, or the at least one RRC signaling comprises the third IE solely.

(17) A method for a wireless device, comprising:
receiving at least one Radio Resource Control (RRC) signaling from a cellular base station, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell); and
performing enhancement on one or more corresponding cells in response to the received at least one RRC signaling,
wherein, the enhancement comprises determining a reduced time period for Primary Synchronization Signal (PSS)/Secondary Synchronization Signal (SSS) detection and/or determining a reduced time period for intra-frequency measurements.

(18) The method of (17), wherein
the method further comprising transmitting at least one capability information to the cellular base station, wherein the at least one capability information comprises one or more of a first capability information indicating support of enhancement on the SCell in FR2, a second capability information indicating support of enhancement on a PSCell, a third capability information indicating support of enhancement on the SCell in Frequency Range 1 (FR1), and a fourth capability information indicating support of enhancement on the Primary Cell (PCell) in FR2.

(19) The method (17) or (18), wherein
the group of IEs further includes a third IE indicating to enable or disable enhancement on the SCell in Frequency Range 1 (FR1), and a fourth IE indicating to enable or disable enhancement on a Primary Cell (PCell) in FR2.

(20) The method of (19), wherein
the first IE, the third IE and/or the fourth IE is defined per User Equipment (UE), per band or per carrier; and/or
the second IE is defined per UE or per band.

(21) The method of (19), wherein
in the case where the PCell is operating in FR2 and the SCell is operating in FR2, the received at least one RRC signaling comprises both the first IE and the fourth IE, or the received at least one RRC signaling comprises the first IE solely;
in the case where the PCell is operating in FR1 and the SCell is operating in FR2, the received at least one RRC signaling comprises both an IE corresponding to a high speed measurement flag and the first IE, or the received at least one RRC signaling comprises the first IE solely; and
in the case where the PCell is operating in FR1 and the SCell is operating in FR1, the received at least one RRC signaling comprises both the IE corresponding to the high speed measurement flag and the third IE, or the received at least one RRC signaling comprises the third IE solely.

(22) The method of (17) or (18), wherein
the reduced time period for PSS/SSS detection is determined at least based on a number of occasions needed for identifying a target cell, a size of a discontinuous reception (DRX) cycle and a scaling factor for DRX, and
in determining the reduced time period for PSS/SSS detection:
the number of occasions is determined as an integer smaller than 24; and/or
the scaling factor is determined as a value less than 1.5.

(23) The method of (22), wherein
the scaling factor is determined as a value less than 1.5 if a Synchronization Signal Block-based Measurement Timing Configuration (SMTC) periodicity is equal to or less than 40 ms.

(24) The method of (22), wherein
the number of occasions is determined as different values for the DRX cycle having a size equal to or smaller than a predetermined threshold, and for the DRX cycle having a size larger than the predetermined threshold, and/or
the scaling factor is determined as different values for the DRX cycle having a size equal to or smaller than a predetermined threshold, and for the DRX cycle having a size larger than the predetermined threshold.

(25) The method of (17) or (18), wherein
the reduced time period for intra-frequency measurements is determined at least based on a number of occasions needed for identifying a target cell, a size of a discontinuous reception (DRX) cycle and a scaling factor for DRX, and
in determining the reduced time period for intra-frequency measurements:
the number of occasions is determined as an integer smaller than 24; and/or
the scaling factor is determined as a value less than 1.5.

(26) The method of (25), wherein
the scaling factor is determined as a value less than 1.5 if a Synchronization Signal Block-based Measurement Timing Configuration (SMTC) periodicity is equal to or less than 40 ms.

(27) The method of (25), wherein
the number of occasions is determined as different values for the DRX cycle having a size equal to or smaller than a predetermined threshold, and for the DRX cycle having a size larger than the predetermined threshold, and/or
the scaling factor is determined as different values for the DRX cycle having a size equal to or smaller than a predetermined threshold, and for the DRX cycle having a size larger than the predetermined threshold.

(28) A method for a cellular base station, comprising
transmitting at least one Radio Resource Control (RRC) signaling to a wireless device, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell),
wherein, the at least one RRC signaling causes the wireless device to perform enhancement on one or more corresponding cells, the enhancement comprises determining a reduced time period for Primary Synchronization Signal (PSS)/Secondary Synchronization Signal (S S S) detection and/or determining a reduced time period for intra-frequency measurements.

(29) The method of (28), wherein
the method is further configured to receive at least one capability information from the wireless device, wherein the at least one capability information comprises one or more of a first capability information indicating support of enhancement on the SCell in FR2, a second capability information indicating support of enhancement on a PSCell, a third capability information indicating support of enhancement on the SCell in Frequency Range 1 (FR1), and a fourth capability information indicating support of enhancement on the Primary Cell (PCell) in FR2.

(30) The method of (28) or (29), wherein
the group of IEs further includes a third IE indicating to enable or disable enhancement on the SCell in first Frequency Range (FR1), and a fourth IE indicating to enable or disable enhancement on a Primary Cell (PCell) in FR2.

(31) The method of (30), wherein
the first IE, the third IE and/or the fourth IE is defined per User Equipment (UE), per band or per carrier; and/or
the second IE is defined per UE or per band.

(32) The method of (30), wherein
in the case where the PCell is operating in FR2 and the SCell is operating in FR2, the at least one RRC signaling comprises both the first IE and the fourth IE, or the at least one RRC signaling comprises the first IE solely;
in the case where the PCell is operating in FR1 and the SCell is operating in FR2, the at least one RRC signaling comprises both an IE corresponding to a high speed measurement flag and the first IE, or the at least one RRC signaling comprises the first IE solely; and
in the case where the PCell is operating in FR1 and the SCell is operating in FR1, the at least one RRC signaling comprises both the IE corresponding to the high speed measurement flag and the third IE, or the at least one RRC signaling comprises the third IE solely.

(33) An apparatus, comprising:
a processor configured to cause a wireless device to:
receive at least one Radio Resource Control (RRC) signaling from a cellular base station, the at least one RRC signaling at least comprises one or more information element (IE) of a group of IEs, wherein, the group of IEs at least includes a first IE indicating to enable or disable enhancement on a Secondary Cell (SCell) in Frequency Range 2 (FR2), and a second IE indicating to enable or disable enhancement on a Primary Secondary Cell (PSCell); and
perform enhancement on one or more corresponding cells in response to the received at least one RRC signaling, wherein, the enhancement comprises determining a reduced time period for Primary Synchronization Signal (PSS)/Secondary Synchronization Signal (SSS) detection and/or determining a reduced time period for intra-frequency measurements.

(34) A computer-readable storage medium storing program instructions, wherein the program instructions, when executed by a computer system, cause the computer system to perform any method of (17)-(27).

(35) A computer-readable storage medium storing program instructions, wherein the program instructions, when executed by a computer system, cause the computer system to perform any method of (28)-(32).

(36) A computer program product, comprising program instructions which, when executed by a computer, cause the computer to perform any method of (17)-(27).

(37) A computer program product, comprising program instructions which, when executed by a computer, cause the computer to perform any method of (28)-(32).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE or BS) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for a wireless device, comprising:
a processor configured to:
receive at least one Radio Resource Control (RRC) signaling from a cellular base station, the at least one RRC signaling at least comprises one or more information element (IE) of a group of IEs, wherein the group of IEs at least includes a first IE indicating to enable or disable enhancement on a Secondary Cell (SCell) in Frequency Range 2 (FR2) and a second IE indicating to enable or disable enhancement on a Primary Secondary Cell (PSCell); and
perform enhancement on one or more corresponding cells in response to the received at least one RRC signaling,
wherein, the enhancement comprises determining a reduced time period for Primary Synchronization Signal (PSS)/Secondary Synchronization Signal (SSS) detection and/or determining a reduced time period for intra-frequency measurements.

2. The apparatus of claim 1, wherein the processor is further configured to transmit at least one capability information to the cellular base station, wherein the at least one capability information comprises one or more of a first capability information indicating support of enhancement on the SCell in FR2, a second capability information indicating support of enhancement on a PSCell, a third capability information indicating support of enhancement on the SCell in Frequency Range 1 (FR1), and a fourth capability information indicating support of enhancement on a Primary Cell (PCell) in FR2.

3. The apparatus of claim 1, wherein
the group of IEs further includes a third IE indicating to enable or disable enhancement on the SCell in Frequency Range 1 (FR1), and a fourth IE indicating to enable or disable enhancement on a Primary Cell (PCell) in FR2.

4. The apparatus of claim 3, wherein
the first IE, the third IE and/or the fourth IE is defined per User Equipment (UE), per band or per carrier; and/or
the second IE is defined per UE or per band.

5. The apparatus of claim 3, wherein
in a case where the PCell is operating in FR2 and the SCell is operating in FR2, the received at least one RRC signaling comprises both the first IE and the fourth IE, or the received at least one RRC signaling comprises the first IE solely;
in a case where the PCell is operating in FR1 and the SCell is operating in FR2, the received at least one RRC signaling comprises both an IE corresponding to a high speed measurement flag and the first IE, or the received at least one RRC signaling comprises the first IE solely; and
in a case where the PCell is operating in FR1 and the SCell is operating in FR1, the received at least one RRC signaling comprises both the IE corresponding to the high speed measurement flag and the third IE, or the received at least one RRC signaling comprises the third IE solely.

6. The apparatus of claim 1, wherein
the reduced time period for PSS/SSS detection is determined at least based on a number of occasions needed for identifying a target cell, a size of a discontinuous reception (DRX) cycle and a scaling factor for DRX, and
in determining the reduced time period for PSS/SSS detection:
the number of occasions is determined as an integer smaller than 24, and/or
the scaling factor is determined as a value less than 1.5.

7. The apparatus of claim 6, wherein
the scaling factor is determined as a value less than 1.5 if a Synchronization Signal Block-based Measurement Timing Configuration (SMTC) periodicity is equal to or less than 40 ms.

8. The apparatus of claim 6, wherein
the number of occasions is determined as different values for the DRX cycle having a size equal to or smaller than a predetermined threshold, and for the DRX cycle having a size larger than the predetermined threshold, and/or
the scaling factor is determined as different values for the DRX cycle having a size equal to or smaller than a predetermined threshold, and for the DRX cycle having a size larger than the predetermined threshold.

9. The apparatus of claim 6, wherein
the reduced time period for intra-frequency measurements is determined at least based on a number of occasions needed for identifying a target cell, a size of a discontinuous reception (DRX) cycle and a scaling factor for DRX, and
in determining the reduced time period for intra-frequency measurements:
the number of occasions is determined as an integer smaller than 24; and/or
the scaling factor is determined as a value less than 1.5.

10. The apparatus of claim 9, wherein
the scaling factor is determined as a value less than 1.5 if a Synchronization Signal Block-based Measurement Timing Configuration (SMTC) periodicity is equal to or less than 40 ms.

11. The apparatus of claim 8, wherein
the number of occasions is determined as different values for the DRX cycle having a size equal to or smaller than a predetermined threshold, and for the DRX cycle having a size larger than the predetermined threshold, and/or
the scaling factor is determined as different values for the DRX cycle having a size equal to or smaller than a predetermined threshold, and for the DRX cycle having a size larger than the predetermined threshold.

12. An apparatus for a cellular base station, comprising:
a processor configured to:
transmit at least one Radio Resource Control (RRC) signaling to a wireless device, the at least one RRC signaling at least comprises one or more information element (IE) of a group of IEs, wherein the group of IEs at least includes a first IE indicating to enable or disable enhancement on a Secondary Cell (SCell) in Frequency Range 2 (FR2) and a second IE indicating to enable or disable enhancement on a Primary Secondary Cell (PSCell),
wherein the at least one RRC signaling causes the wireless device to perform enhancement on one or more corresponding cells, and the enhancement comprises determining a reduced time period for Primary Synchronization Signal (PSS)/Secondary Synchronization Signal (SSS) detection and/or determining a reduced time period for intra-frequency measurements.

13. The apparatus of claim 12, wherein the processor is further configured to receive at least one capability information from the wireless device, wherein the at least one capability information comprises one or more of a first capability information indicating support of enhancement on the SCell in FR2, a second capability information indicating support of enhancement on a PSCell, a third capability information indicating support of enhancement on the SCell in Frequency Range 1 (FR1), and a fourth capability information indicating support of enhancement on a Primary Cell (PCell) in FR2.

14. The apparatus of claim 13, wherein
the group of IEs further includes a third IE indicating to enable or disable enhancement on the SCell in Frequency Range 1 (FR1), and a fourth IE indicating to enable or disable enhancement on a Primary Cell (PCell) in FR2.

15. The apparatus of claim 14, wherein
the first IE, the third IE and/or the fourth IE is defined per User Equipment (UE), per band or per carrier; and/or
the second IE is defined per UE or per band.

16. The apparatus of claim 14, wherein
in a case where the PCell is operating in FR2 and the SCell is operating in FR2, the at least one RRC signaling comprises both the first IE and the fourth IE, or the at least one RRC signaling comprises the first IE solely;
in a case where the PCell is operating in FR1 and the SCell is operating in FR2, the at least one RRC signaling comprises both an IE corresponding to a high speed measurement flag and the first IE, or the at least one RRC signaling comprises the first IE solely; and
in a case where the PCell is operating in FR1 and the SCell is operating in FR1, the at least one RRC signaling comprises both the IE corresponding to the high speed measurement flag and the third IE, or the at least one RRC signaling comprises the third IE solely.

17. A method for a wireless device, comprising:
receiving at least one Radio Resource Control (RRC) signaling from a cellular base station, the at least one RRC signaling at least comprises one or more information element (IE) of a group of IEs, wherein the group of IEs at least includes a first IE indicating to enable or disable enhancement on a Secondary Cell (SCell) in Frequency Range 2 (FR2) and a second IE indicating to enable or disable enhancement on a Primary Secondary Cell (PSCell); and
performing enhancement on one or more corresponding cells in response to the received at least one RRC signaling,
wherein the enhancement comprises determining a reduced time period for Primary Synchronization Signal (PSS)/Secondary Synchronization Signal (SSS) detection and/or determining a reduced time period for intra-frequency measurements.

18. The method of claim 17, wherein
the method further comprising transmitting at least one capability information to the cellular base station, wherein the at least one capability information comprises one or more of a first capability information indicating support of enhancement on the SCell in FR2, a second capability information indicating support of enhancement on a PSCell, a third capability information indicating support of enhancement on the SCell in Frequency Range 1 (FR1), and a fourth capability information indicating support of enhancement on a Primary Cell (PCell) in FR2.

19. The method of claim 18, wherein
the group of IEs further includes a third IE indicating to enable or disable enhancement on the SCell in Frequency Range 1 (FR1), and a fourth IE indicating to enable or disable enhancement on a Primary Cell (PCell) in FR2.

20. The method of claim 19, wherein
the first IE, the third IE and/or the fourth IE is defined per User Equipment (UE), per band or per carrier; and/or
the second IE is defined per UE or per band.

* * * * *